(No Model.)
2 Sheets—Sheet 1.
J. J. G. C. SCHMIDT.
CHART FOR LAYING OUT PATTERNS.
No. 327,725.
Patented Oct. 6, 1885.
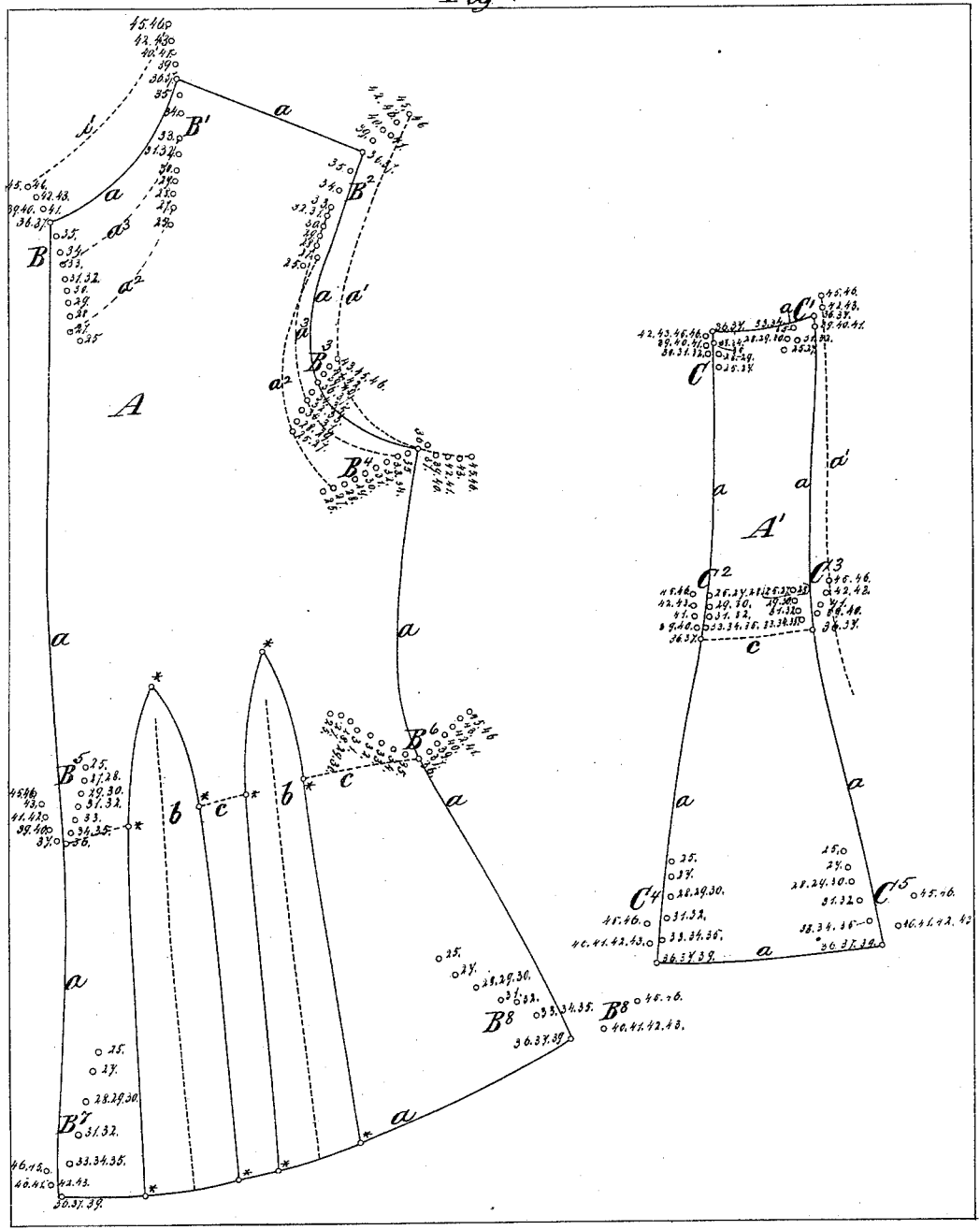
Witnesses:
Emil Herter.
O. Sundgren
Inventor:
John J. G. C. Schmidt
By his Attys
Brown & Hall

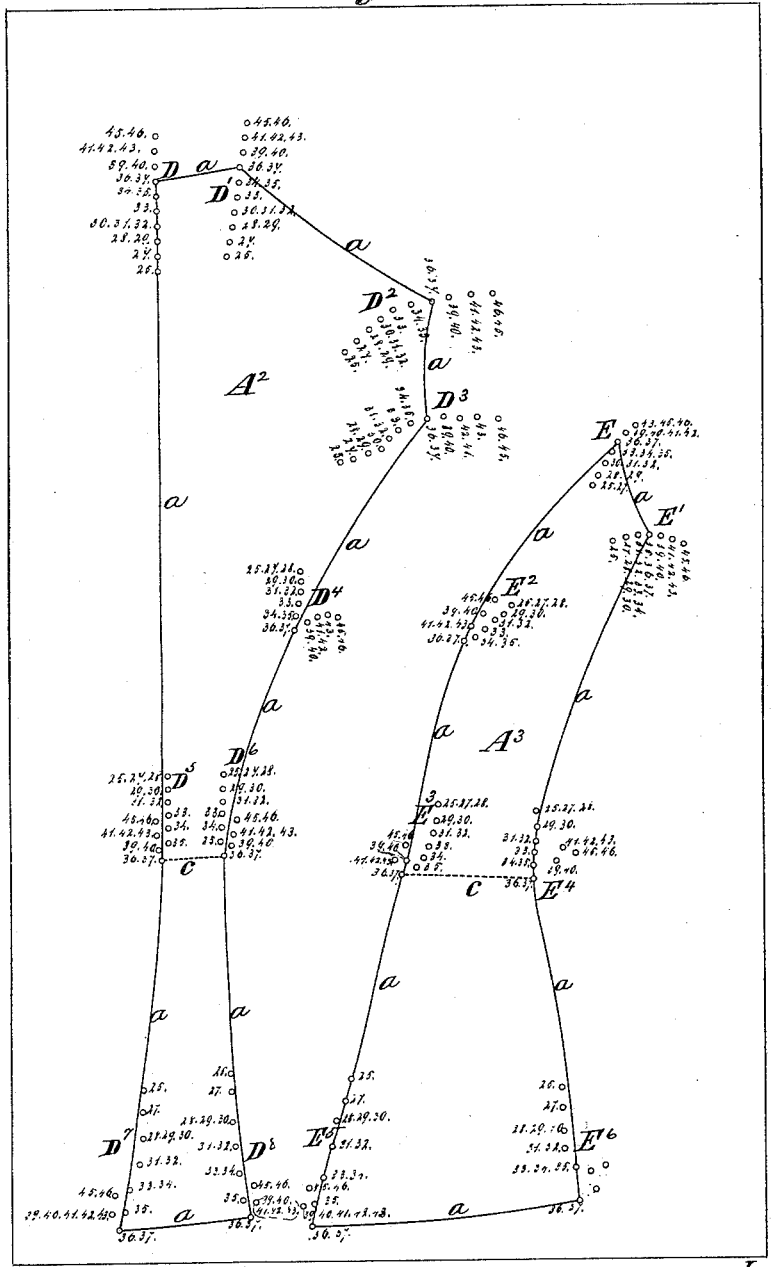

UNITED STATES PATENT OFFICE.

JOHN J. G. C. SCHMIDT, OF NEW YORK, ASSIGNOR OF ONE-HALF TO RICHARD W. BEYRICH, OF BROOKLYN, NEW YORK.

CHART FOR LAYING OUT PATTERNS.

SPECIFICATION forming part of Letters Patent No. 327,725, dated October 6, 1885.

Application filed April 24, 1885. Serial No. 163,346. (No model.)

*To all whom it may concern:*

Be it known that I, JOHN J. G. C. SCHMIDT, of the city and county of New York, in the State of New York, have invented a new and useful Improvement in Charts for Laying Out Patterns for Dress-Waists and other Articles of Wearing-Apparel, of which the following is a specification.

The invention is more particularly intended for laying out patterns for dress-waists and other tightly-fitting garments for ladies and children.

My invention consists in a chart for laying out patterns for garments having several series of holes or perforations arranged substantially as hereinafter described, and also having other perforations indicating the position of gores, the holes in the several series being designated by corresponding figures indicating the bust-measure for which each hole or perforation is intended.

In the accompanying drawings I have represented the charts which are necessary to lay out patterns for a basque for children and ladies varying from twenty-five inches to forty-six inches bust-measurements.

Figure 1 represents the chart which is employed to lay out the front and side portions, and Fig. 2 represents the chart which is employed to lay out the back portions of the garment. In these figures I have represented by full lines one pattern which may be laid out from the chart, and in Fig. 1 I have represented by dotted lines portions of other patterns which may be laid out from the chart, and which better illustrate the great range in size of patterns which may be laid out by the use of the chart.

Referring first to Fig. 1, A designates the pattern for the front portion of the basque. To adapt the chart for laying out this pattern it is provided with several series of holes designated by the letters B B' B² B³ B⁴ B⁵ B⁶ B⁷ B⁸. These several series of holes have upon them figures representing the bust-measure for which the several holes are intended. In some cases two or more figures are employed to designate the same hole, because the variations at that point between the bust-measures of different sizes will be so very slight as not to be noticeable. For example, in the series of holes B⁸ the same hole is designated by the figures 28, 29, and 30, and another hole is designated by the figures 40, 41, 42, and 43.

To lay out a pattern from this chart it is only necessary to take the bust of the person, and then after laying the chart over the paper from which the pattern is to be made mark through the holes in the chart which are designated by figures indicating the bust-measure, and then draw lines between these several holes to give the outline of the pattern. For example, the pattern A is supposed to be for a person having a thirty-six-inch bust-measure. After the chart is laid on the paper the paper is marked through all the holes which are designated by the figures 36 in the several series, and then full lines *a* are drawn between these holes 36 in the several series, as shown in Fig. 1. The paper may be then cut along these lines, and a pattern will then be obtained adapted for a person of thirty-six-inch bust-measure.

By the dotted lines $a'$ $a^2$ $a^3$ in Fig. 1 I have represented portions of other patterns for different bust-measures which can be formed by the use of this chart. For example, if the bust-measure were forty-five inches the neck and arm-hole portions of the pattern will be cut on the dotted lines $a'$. If the bust-measure were twenty-seven inches, the neck and arm-hole portions of the pattern will be cut upon the dotted lines $a^2$, and if the bust-measure were thirty-three inches the neck and arm-hole portions of the pattern will be cut upon the dotted line $a^3$.

For sufficiently varying the size of the waist when not normal with the bust-measure, gores may be formed in the pattern, as indicated at *b*, Fig. 1, and the chart has holes or perforations *, through which the paper for the pattern may be marked in order to properly locate these gores in the pattern.

A', Fig. 1, designates the side portion of the pattern, which may be laid out from the chart. To adapt the chart for forming this portion of the pattern, it is provided with series of holes C C' C² C³ C⁴ C⁵. Thirty-six inches being the bust-measure desired, the paper for the pattern is marked through the holes 36, and lines *a* are then drawn connecting those marks. The paper is then cut along these lines to produce the pattern A'. The dotted line $a'$ in the part A', Fig. 1, designates a part of the outline of a pattern for forty-five or forty-six inches bust-measure.

In Fig. 2 I have represented the chart for laying out the pattern portions $A^2$ $A^3$ for the back of the garment. To adapt the chart for laying out the pattern portion $A^2$, it is provided with series of holes D D' $D^2$ $D^3$ $D^4$ $D^5$ $D^6$ $D^7$ $D^8$.

The bust-measure being thirty-six inches, the paper for the pattern is marked through all the holes 36 in the several series, and the lines $a$ are drawn connecting these holes in the several series and giving the outline of the pattern. To adapt the chart for laying out the pattern portion $A^3$ it has series of holes E E' $E^2$ $E^3$ $E^4$ $E^5$ $E^6$. The bust-measure being thirty-six inches, the paper for the pattern is marked through the holes designated by the figures 36 in all the series, and the lines $a$ connecting these holes indicate the outlines for the pattern.

The pattern, as shown in full in the drawings, is intended for a basque; but if the several portions of the pattern are only produced down to the dotted line $c$ (shown in all the portions A A' $A^2$ $A^3$) a pattern would be provided for a dress-waist. As will be understood from the previous description, the several series of holes or perforations in the chart are so arranged that it is only necessary to take the bust-measure of a person, and by the arrangement of the chart the several portions of a pattern of a garment may be laid out. To adapt the chart for such use the holes or perforations of the several series must be designated by letters or figures which indicate the bust-measure for which each hole is intended.

What I claim as my invention, and desire to secure by Letters Patent, is—

The chart for laying out patterns for garments, having several series of holes or perforations, as herein described, and also having other perforations, *, indicating the position of gores, the holes in the several series being designated by corresponding figures indicating the bust-measure for which each hole is intended, whereby provision is afforded for laying out a pattern after obtaining the bust-measure only, substantially as herein set forth.

JOHN J. G. C. SCHMIDT.

Witnesses:
 FREDK. HAYNES,
 MATTHEW POLLOCK.